United States Patent
Higuchi

(10) Patent No.: US 6,597,390 B1
(45) Date of Patent: *Jul. 22, 2003

(54) ELECTRONIC ENDOSCOPE APPARATUS

(75) Inventor: Mitsuru Higuchi, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/479,601

(22) Filed: Jan. 7, 2000

(30) Foreign Application Priority Data

Jan. 11, 1999 (JP) .......................................... 11-003954
Jan. 11, 1999 (JP) .......................................... 11-003955

(51) Int. Cl.$^7$ .............................................. H04N 7/18
(52) U.S. Cl. ............................. 348/65; 348/68; 348/69; 348/71; 600/101; 600/109; 600/160; 382/103
(58) Field of Search .............................. 348/65, 68, 71, 348/61, 69, 220, 257, 231, 70; 382/103, 128, 255; 600/101, 109, 160

(56) References Cited

U.S. PATENT DOCUMENTS 4,853,773 A  *  8/1989  Hibino et al. .................. 348/65
5,010,395 A  *  4/1991  Tsuji et al. .................... 348/71
5,506,912 A  *  4/1996  Nagasaki et al. ........... 382/103
5,929,900 A  *  7/1999  Yamanaka et al. ............ 348/65
6,456,317 B1 *  9/2002  Matsumoto et al. .......... 348/68
6,489,987 B1 * 12/2002  Higuchi et al. ............... 348/65

* cited by examiner

Primary Examiner—Chris Kelley
Assistant Examiner—Shawn S. An
(74) Attorney, Agent, or Firm—Snider & Associates; Ronald R. Snider

(57) ABSTRACT

The present electronic endoscope apparatus makes it possible to select either of a conventional pixel mixing and reading system and a new all-pixel reading system. For example, an electronic endoscope apparatus having a pixel mixing and reading system circuit section is configured so that an all pixel reading system circuit board for reading all pixel signals out of a CCD while using an opaque period can be selectively set to the electronic endoscope apparatus, it is judged by a microcomputer whether the all pixel reading system circuit board is present, and when the circuit board is present, an all-pixel reading system operation is executed. Moreover, it is permitted to use the pixel mixing and reading system and all-pixel reading system circuit sections as standard sections, normally execute all-pixel reading system operations, and when, for example, a freeze switch is pressed at power-on, pixel mixing and reading system operations may be executed. Furthermore, it is displayed on a monitor by a character or icon whether the pixel mixing and reading system or all-pixel reading system is currently operated.

7 Claims, 11 Drawing Sheets

FIG. 2(A)
| Mg | Cy | Mg | (LINE 0) | Mg | Cy |
| G | Ye | G | (LINE 1) | G | Ye |
| Mg | Cy | Mg | (LINE 2) | Mg | Cy |
| G | Ye | G | (LINE 3) | G | Ye |
| Mg | Cy | Mg | (LINE 4) | Mg | Cy |
| : | : | : | (LINE N) | : | : |
FIG. 2(B)
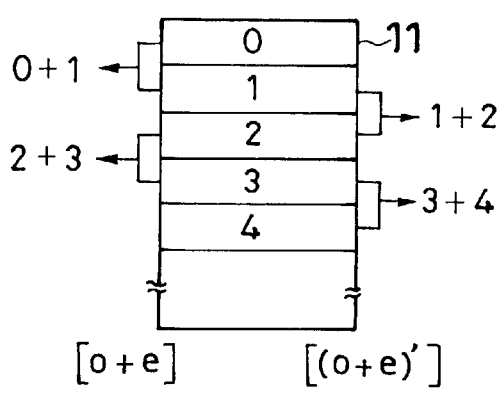
FIG. 2(C)
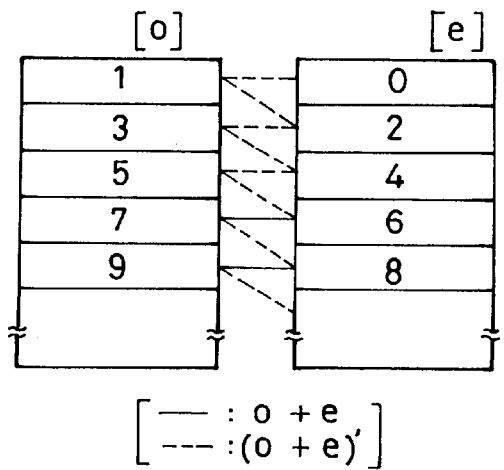
$\left[\begin{array}{l}\text{——} : o+e \\ \text{---} : (o+e)'\end{array}\right]$
FIG. 2(D)
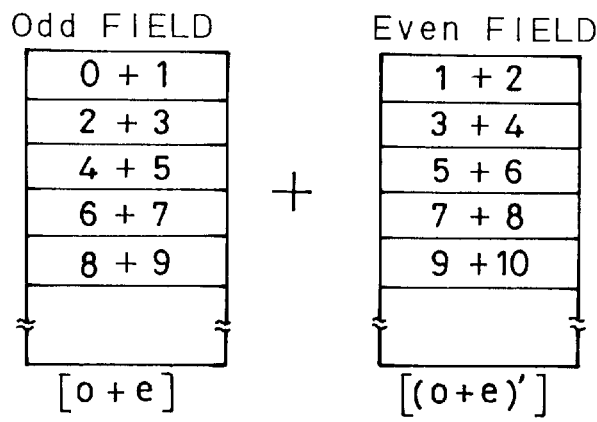

FIG. 8

(B-SYSTEM DYNAMIC IMAGE)

| | | | | | | | | |
|---|---|---|---|---|---|---|---|---|
| (A) O/E SIGNAL | $O_1$ | $E_1$ | $O_2$ | $E_2$ | $O_3$ | $E_3$ | $O_4$ | $E_4$ | $O_5$ |
| (G) M1 READ | | $(O_1)$ | $O_1$ | $(O_2)$ | $O_2$ | $(O_3)$ | $O_3$ | $(O_4)$ | $O_4$ |
| (H) M2 READ | | | $e_1$ | $e_1$ | $e_2$ | $e_2$ | $e_3$ | $e_3$ | $e_4$ | $e_4$ |
| (I) M3 READ | | | $O_1$ | $O_1$ | $O_2$ | $O_2$ | $O_3$ | $O_3$ | $O_4$ | $O_4$ |
| (J) M4 WRITE | | | | | $e_1+O_1$ | $e_2+O_2$ | $e_3+O_3$ |
| (K) M5 WRITE | | | | $(e_1+O_1)'$ | $(e_2+O_2)'$ | $(e_3+O_3)'$ |
| (L) M4 READ | | | | | $e_1+O_1$ | $e_2+O_2$ | $e_3+O_3$ |
| (M) M5 READ | | | | | $(e_1+O_1)'$ | $(e_2+O_2)'$ |

FIG. 9
(B-SYSTEM STATIC IMAGE)

| | | | | | | | | |
|---|---|---|---|---|---|---|---|---|
| (A) O/E SIGNAL | O1 | E1 | O2 | E2 | O3 | E3 | O4 | E4 | O5 |
| (B) FREEZ TRIGGER | | ⌐_ | | | | | | | |
| (C) M1 WRITE | | o1 | | WRITE INHIBIT | o3 | | o4 | | |
| (D) M2 WRITE | | | e1 | WRITE INHIBIT | | e3 | | e4 | |
| (E) M1 READ | | | (o1) | o1 | o1 | o1 | (o3) | o3 | o4 |
| (F) M2 READ | | | | e1 | e1 | e1 | e1 | e3 | e4 |
| (G) M3 READ | | | | o1 | o1 | o1 | o1 | o3 | o4 |
| (H) M4 WRITE | | | | | | e1+o1 | WRITE INHIBIT | | |
| (I) M5 WRITE | | | | | | | (e1+o1) | WRITE INHIBIT | |
| (J) M4 READ | | | | | | | e1+o1 | e1+o1 | e1+o1 |
| (K) M5 READ | | | | | | | | (e1+o1) | (e1+o1) |

ELECTRONIC ENDOSCOPE APPARATUS

BACKGROUND OF THE INVENTION

This application claims the priority of Japanese Patent Applications Nos. 11-3954 and 11-3955 filed on Jan. 11, 1999, which are incorporated herein by reference.

The present invention relates to an electronic endoscope apparatus, particularly to a configuration of an electronic endoscope apparatus capable of selectively and easily using an all-pixel reading system for reading all pixels in addition to a conventional pixel mixing and reading system.

DESCRIPTION OF THE PRIOR ART

In the case of a solid-state image pickup device used for an electronic endoscope apparatus such as a CCD (Charge Coupled Device), a video signal is obtained by reading electric charges accumulated in pixels by a photoelectric conversion device. In the case of this type of the CCD used for a simultaneous-type electronic endoscope apparatus, color filters of Mg (magenta), Cy (cyan), G (green), and Ye (yellow) are arranged on the upside of the CCD and thereby, a color image is formed.

Moreover, according to a conventional color difference line successively mixing and reading (pixel-mixing-and-reading) system, accumulated electric charges of pixels on upper and lower horizontal lines are added, mixed, and read out of a CCD and thereby, video signals of an odd field and an even field are successively formed at a timing of, for example, 1/60 sec. Thereafter, these odd-field signal and even-field signals are interlace-scanned and formed as an image for one frame, and the image is displayed on a monitor as a dynamic image.

Moreover, in the case of this type of the electronic endoscope apparatus, a freeze switch is set to an operating section and when the freeze switch is pressed, the then static image is formed and displayed.

However, in the case of the above pixel mixing and reading system, there is a time lag of 1/60 sec between an odd field image and an even-field image (between two times of exposure) for forming one frame image. Therefore, if an endoscope moves or an object to be observed moves in the above period, a problem occurs that the image quality is deteriorated.

Moreover, an electronic endoscope apparatus uses various electronic shutter functions for changing signal accumulation times and thereby, it is possible to improve the image quality by decreasing the accumulation time at a near bright place. However, a trouble also occurs that the advantage of decreasing the accumulation time cannot be sufficiently given to a static image or the like because of the above time lag of 1/60 sec.

BRIEF SUMMARY OF THE INVENTION

The present invention is made to solve the above problem and its object is to propose an all-pixel reading system capable of obtaining a high-quality image instead of a conventional pixel mixing and reading system and provide an electronic endoscope apparatus capable of selecting one of these systems in accordance with a state of a user or the like.

SUMMARY OF THE INVENTION

To attain the above object, an electronic endoscope apparatus of the present invention comprises a pixel mixing and reading system circuit section of mixing pixel signals between upper and lower horizontal lines and reading them out of an image pickup device, an all-pixel reading system circuit section of reading all pixel signals generated by the image pickup device while using a predetermined opaque period (light shading period), and a control circuit for controlling these circuit sections, wherein one of the pixel mixing and reading system and all-pixel reading system circuit sections is normally set, the other is constituted so that it can be selectively set, and the control circuit judges whether a circuit section which can be selectively set is present and when the presence of the circuit section is detected, controls the circuit section so as to execute the circuit-section-type operation. The control circuit can judge whether a circuit section is present by detecting the change of output states of a predetermined terminal of a connector connected with each circuit section.

According to the present invention, a pixel mixing and reading system circuit board is normally used and an all-pixel reading system circuit board is constituted so that it can be set by a connector or the like. Moreover, when a set state of the all-pixel reading system circuit board is judged by the control circuit but the presence of the circuit board is not detected, pixel-mixed signals of two horizontal lines are read out of a solid-state image pickup device by a conventional pixel mixing and reading system and dynamic and static images are formed in accordance with the pixel mixed signals.

However, when the presence of the all pixel reading system circuit board is detected, all pixel signals are read out of the solid-state image pickup device by the all pixel reading system. That is, signals of all pixels obtained through one-time exposure are extracted by reading odd-line signals in the next opaque period (light-interrupted by opaque means) and even-line signals at the next period (exposure period) from the electric charges accumulated through exposure (exposure time is optional) every 1/60-sec period (vertical sync period).

Then, the above odd-line and even-line signals are later mixed between upper and lower lines, finally formed into mixed signals same as conventional ones, and serve as odd-field and even-field signals and thus, a dynamic image is formed in accordance with these signals. Moreover, though a static image is also displayed in accordance with a freeze signal, a static image is formed in accordance with video data obtained through one-time exposure by the all-pixel reading system and the static image has a high image quality compared to the case of the pixel mixing and reading system.

Further, for example, "H" is displayed on a monitor screen while an operation of the all-pixel reading system is executed, and "L" is displayed on a monitor screen while an operation of the pixel mixing and reading system is executed, so that the system operated can be easily confirmed by the display of these characters.

Furthermore, it is preferable to use a memory for temporarily storing odd-line data and even-line data generated by an image pickup device and adjusting phases of these data values as a circuit section of the all-pixel reading system and set a through-line not passing the memory, and supply an optical black pulse for clamping a black level of a video signal to a signal processing section at the subsequent stage via the through-line.

Another aspect of the present invention comprises an electronic endoscope apparatus provided with an image pickup device, a processor unit connecting with the electronic endoscope apparatus, switches for various operation, a pixel mixing and reading system circuit for mixing pixel signal between upper and lower horizontal lines and reading them out of the image pickup device, an all-pixel reading system circuit for reading all pixel signals generated by the image pickup device through the same exposure while using a predetermined opaque period, and a control circuit for performing the control for selectively operating either of the pixel mixing and reading system and the all-pixel reading system, judging whether a predetermined switch other than a power-supply switch among the above switches at power-on, and executing either of the above systems when detecting that the predetermined switch is pressed.

It is preferable that the predetermined switch uses an operation switch of an electronic endoscope apparatus.

According to still another aspect of the present invention, when a pixel mixing and reading system circuit and an all-pixel reading system circuit are provided for an electronic endoscope apparatus and, for example, an all-pixel reading system is set so as to be preferentially executed, and a power supply is turned on while pressing a freeze switch (or other existing switch) of an electronic endoscope, operations of the all-pixel reading system are executed by control-circuit's detecting a freeze-switch-pressed signal.

BRIEF DESCRIPTION OF THE DRAWINGS

FIGS. 2(A) to 2(D) are illustrations showing a color filter structure of a CCD and pixel mixing and reading system processing and all-pixel reading system processing in an embodiment;

FIGS. 8(A) and 8(G) to 8(M) are wave form diagrams showing operations continued from FIG. 7 for forming a dynamic image in accordance with the all-pixel reading system (B system);

FIGS. 9(A) to 9(K) are waveform diagrams showing operations for forming a static image in accordance with the all-pixel reading system (B system);

DETAILED DESCRIPTION OF THE PREFERRED EMBODIMENTS

First Embodiment

Figure 1:
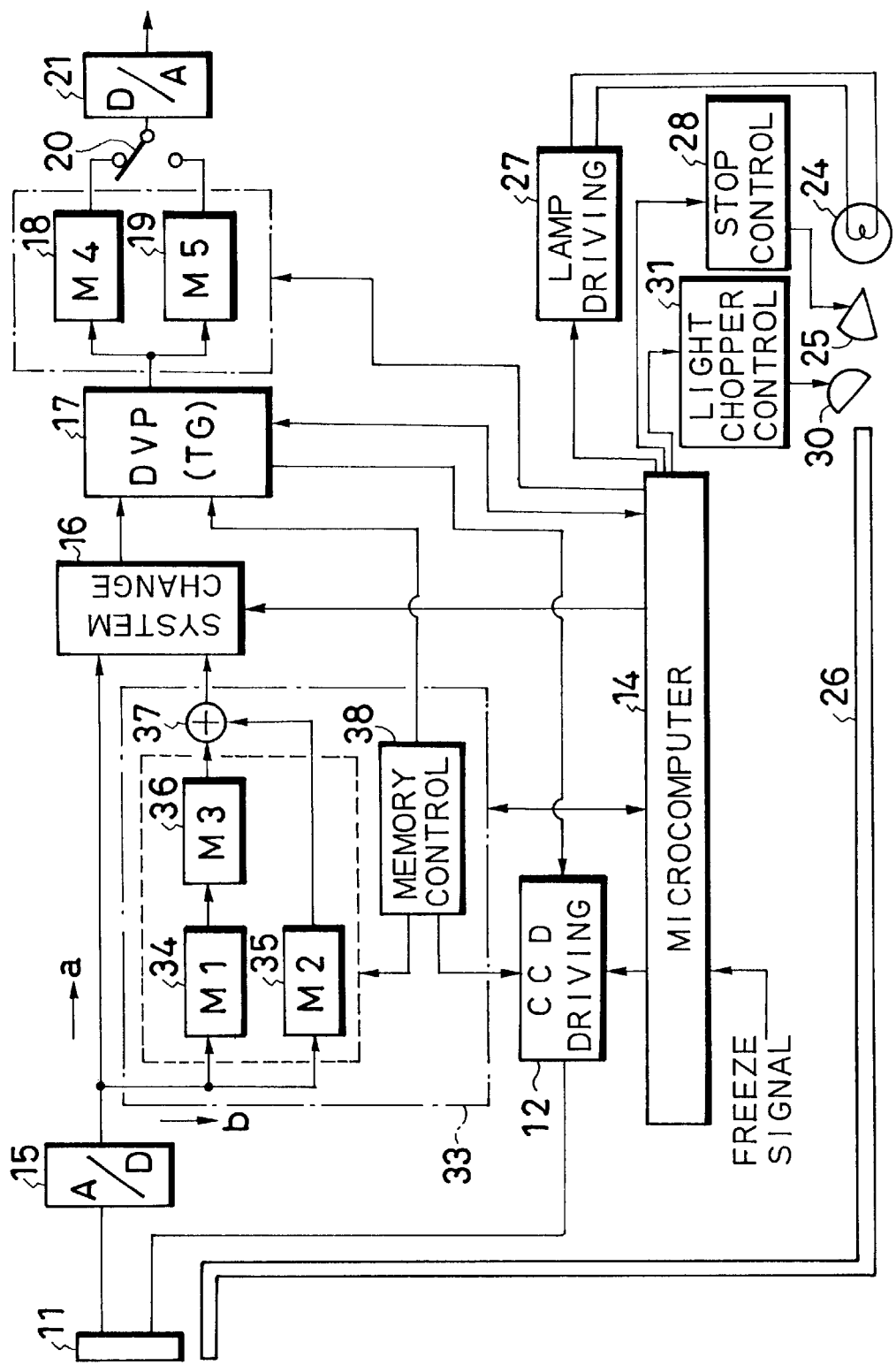
FIG. 1 is a block diagram showing a circuit configuration of an electronic endoscope apparatus of a first embodiment of the present invention.

FIG. 1 shows a circuit configuration of an electronic endoscope apparatus of the first embodiment and FIGS. 2(A) to 2(D) show a configuration of a color filter of a solid-state image pickup device and pixel mixing and reading system (A-system) processing and all-pixel reading system (B-system) processing. The electronic endoscope apparatus in FIG. 1 is provided with a CCD 11 having a color filter at the front end of an electronic scope. In the case of the color filter of the CCD 11, Mg (magenta) and Cy (cyan) filters are alternately arranged on even lines and G (green) and Ye (yellow) filters are alternately arranged on odd lines in pixels as sown in FIG. 2(A). Moreover, in the case of color image processing, a color video signal is formed by mixing and computing signals obtained through the color filters.

A CCD driving circuit 12 for driving the CCD 11 is connected to the CCD 11 and controlled by a microcomputer 14 to drive a pixel mixing and reading system and an all-pixel reading system. For example, in the case of the all-pixel reading system, two types of pulses (P1 and P2) whose timings for reading accumulated data values for all pixels accumulated in the CCD 11 through one-time exposure by classifying the data values into those for odd lines and those for even lines are shifted from each other are supplied from the CCD driving circuit 12 to successively read out odd-line signals and even-line signals separately. In the case of the pixel mixing and reading system, one type of a read pulse is supplied to each line. The microcomputer 14 generally controls the electronic endoscope apparatus and executes the change control for processing images in accordance with the above both systems.

The CCD 11 is provided with an A/D converter 15 for converting an analog signal to a digital signal, and a system changer 16 for changing a pixel mixing and reading mode and an all pixel reading mode through a route "a," and a digital signal processor (DVP) 17 for applying predetermined color image processing to a video signal are set to the rear stage of the A/D converter 15. The DVP 17 includes a timing generator (TG) to perform various processings such as white balance, γ compensation, contour compensation, image position control, and enlargement.

A fourth memory 18 and a fifth memory 19 for storing odd-filed data and even-field data, a change circuit 20, and a D/A converter 21 are set to the rear stage of the DVP 17. In the case of a standard pixel mixing and reading system, the system changer 16 selects the route "a" and forms a dynamic image and a static image by using the above configuration in accordance with a video signal input through the route "a."

Moreover, a light source section of the electronic endoscope apparatus is provided with a lamp 24 and a stop 25 and output light of the lamp 24 is guided up to the front end of a scope by a light guide 26. The lamp 24 is turned on by a lamp driving circuit 27 and the stop 25 is controlled by a stop control circuit 28. The stop control circuit 28 controls an opening degree of the stop 25 in accordance with aluminance signal so that screen brightness becomes constant. Moreover, in the case of this embodiment, a semicircular light chopper 30 is set between the stop 25 and an incident edge of the light guide 26 for all-pixel reading system processing and rotated by a light chopper control circuit 31. When the all-pixel reading system is executed, the light chopper 30 and light chopper control circuit 31 alternately interrupt light in the period of a field O/E signal having a cycle of 1/60 sec so that all pixels obtained through one-time exposure can be read.

Moreover, this embodiment is already provided with an all-pixel reading system circuit board 33 as illustrated. The circuit board 33 can be set and connected to a predetermined position of the system by general connecting means such as a removable connector. Therefore, the circuit board 33 is selectively and optionally set. The all-pixel reading system circuit board 33 is provided with, for example, a first memory 34 for storing video data on odd lines, a second memory 35 for storing video data on even lines, a phase-adjusting third memory 36 for directly storing the data in the first memory 34 and delaying a read timing by 1/60 sec, a mixing circuit 37, and a memory control circuit 38.

That is, all pixel signals obtained by the CCD 11 are divided into odd-line data and even-line data and temporarily stored in the memories 34 and 35. The phase of the odd-line data in the first memory 34 is delayed by 1/60 sec and adjusted to the phase of the even-line data in the second memory 35. Thereafter, in the mixing circuit 37 at the next stage, the odd-line pixel data in the third memory 35 and the even-line pixel data in the second memory 34 are added and mixed each other and a pixel-mixed signal same as the case of the pixel mixing and reading system is formed.

A set state of the above all-pixel mixing and reading system circuit board 33 is judged by the microcomputer 14. For example, by assuming an output state of a predetermined terminal of a connector the like when not connected as Low state and setting the terminal so as to change from Low to High states when the all-pixel reading system circuit board 33 is set, it is possible to detect the presence of the circuit board 33. Moreover, when confirming the presence of the circuit board 33, the microcomputer 14 changes signal lines from the route "a" to the route "b" by the system changer 16 (when capturing a video signal) and moreover changes processings of the CCD driving circuit 12 and light chopper control circuit 31 to the all-pixel reading system processing. In the case of the electronic endoscope apparatus, a freeze switch is set to the operating section of a scope. Therefore, a static-image-forming operation is executed when the microcomputer 14 receives a freeze signal from the freeze switch.

The first embodiment is constituted as described above. First, the difference between the pixel mixing and reading system processing and the all-pixel reading system processing are described below by referring to FIG. 2. As shown in FIG. 2(A), the CCD 11 having a color filter for each pixel is constituted so that horizontal lines are formed from line 0 up to line N and the pixel data of the horizontal lines are read by transferring the data to transfer lines. Moreover, in the case of the pixel mixing and reading system, as shown in FIG. 2(B), addition signals {o(odd line)+e(even line)} of line 0+line 1, line 2+line 3, line 4+line 5, . . . and addition signals {(o+e)'} of line 1+line 2, line 3+line 4, line 5+line 6, . . . are alternately read directly out of the CCD 11 (the both types of signals are obtained in different exposure periods). Furthermore, as shown in FIG. 2(D), these signals are output to the fourth and fifth memories 18 and 19 as odd-field data and even-field data.

In the case of the all pixel reading system, as shown in FIG. 2(C), signals of odd lines 1, 3, 5, . . . (opaque period) and signals of even lines 0, 2, 4, . . . (next period) are read out of all pixel signals obtained through one-time exposure. Thereafter, these odd-line and even-line signals are added each other by the mixing circuit 37 as shown by an illustrated continuous line (o+e) and a dotted line {(o+e)'} and finally, become odd-field data and even-field data shown in FIG. 2(D) and output to the fourth and fifth memories 18 and 19.

Figure 3:
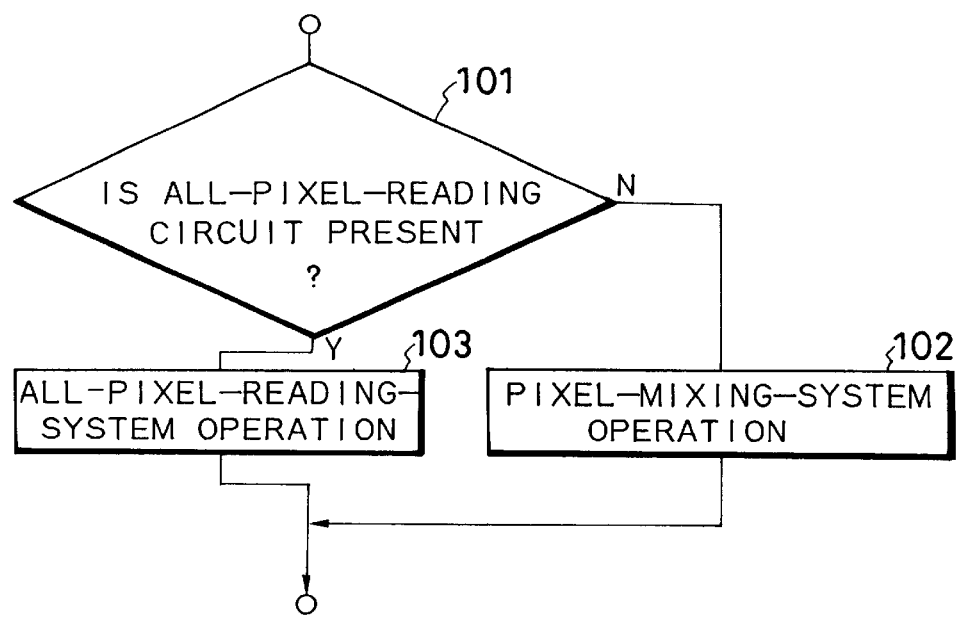
FIG. 3 is an illustration showing operations of the first embodiment in a microcomputer.

FIG. 3 shows a system change operation by the microcomputer 14. As illustrated, in step 101, it is judged whether the all-pixel reading system circuit board 33 is present. In case of "NO," the pixel mixing and reading system operation is executed in step 102. In case of "YES," the all-pixel reading system operation is executed in step 103.

Figure 4:
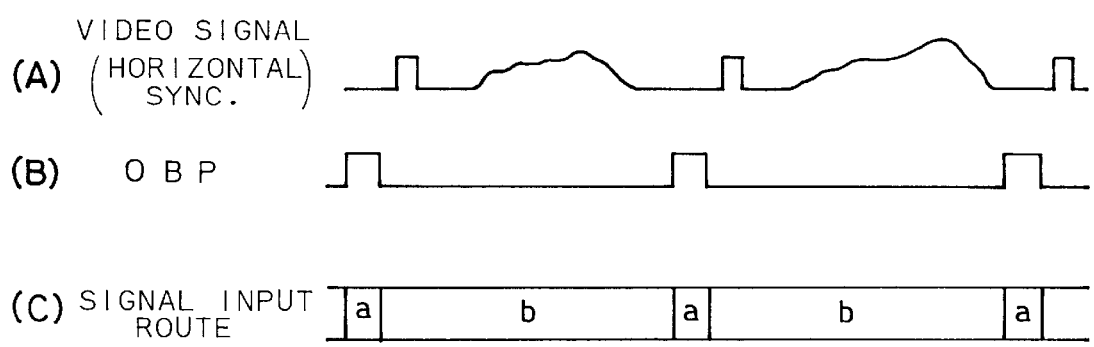
FIGS. 4(A) to 4(C) are waveform diagrams showing operations for capturing a black level signal by an embodiment.

FIGS. 4(A) to 4(C) show extraction of a black level signal while the all-pixel reading system processing is executed. In case of this embodiment, even for the all pixel reading system, a black level signal obtained through the route "a" is clamped for an optical black signal. For example, the optical black pulse (OBP) in FIG. 4(B) is supplied to the horizontally-synchronized video signal output from the CCD 11 shown in FIG. 4(A). The system change circuit 16 in FIG. 1 is made to perform a change operation in accordance with the optical black pulse to change an signal input route to the route "a" only in an optical black period as shown in FIG. 4(C). Thereby, it is prevented that the color reproducibility is deteriorated when returning from static image display to dynamic image display.

That is, in case of formation of a static image by the all-pixel reading system, the video data stored in the first and second memories 34 and 35 are repeatedly read. Therefore, write of the next data is inhibited and clamping is executed by the DVP 17 at the rear stage in accordance with old data (data several periods before). Therefore, black levels of a signal can be greatly changed when a static image is shifted to a dynamic image. In case of this embodiment, fluctuation of black levels when shifting to a dynamic image is controlled so that a preferable color reproducibility is obtained by inputting only the latest black-level signal serving as a criterion of color processing through the route "a."

Figure 5:
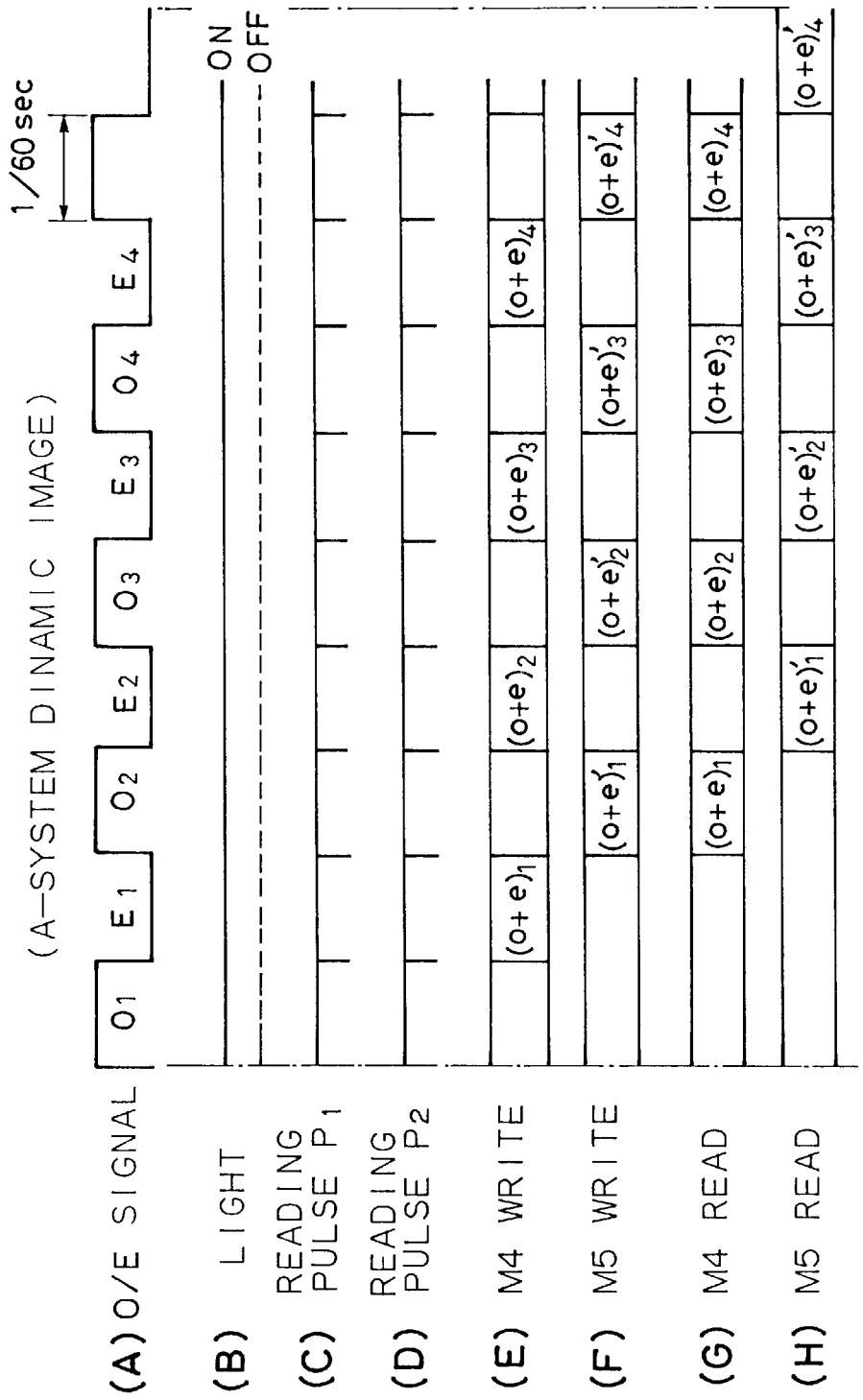
FIGS. 5(A) to 5(H) are waveform diagrams showing operations for forming a dynamic image in accordance with a pixel mixing and reading system (A system) of the first embodiment.
Figure 6:
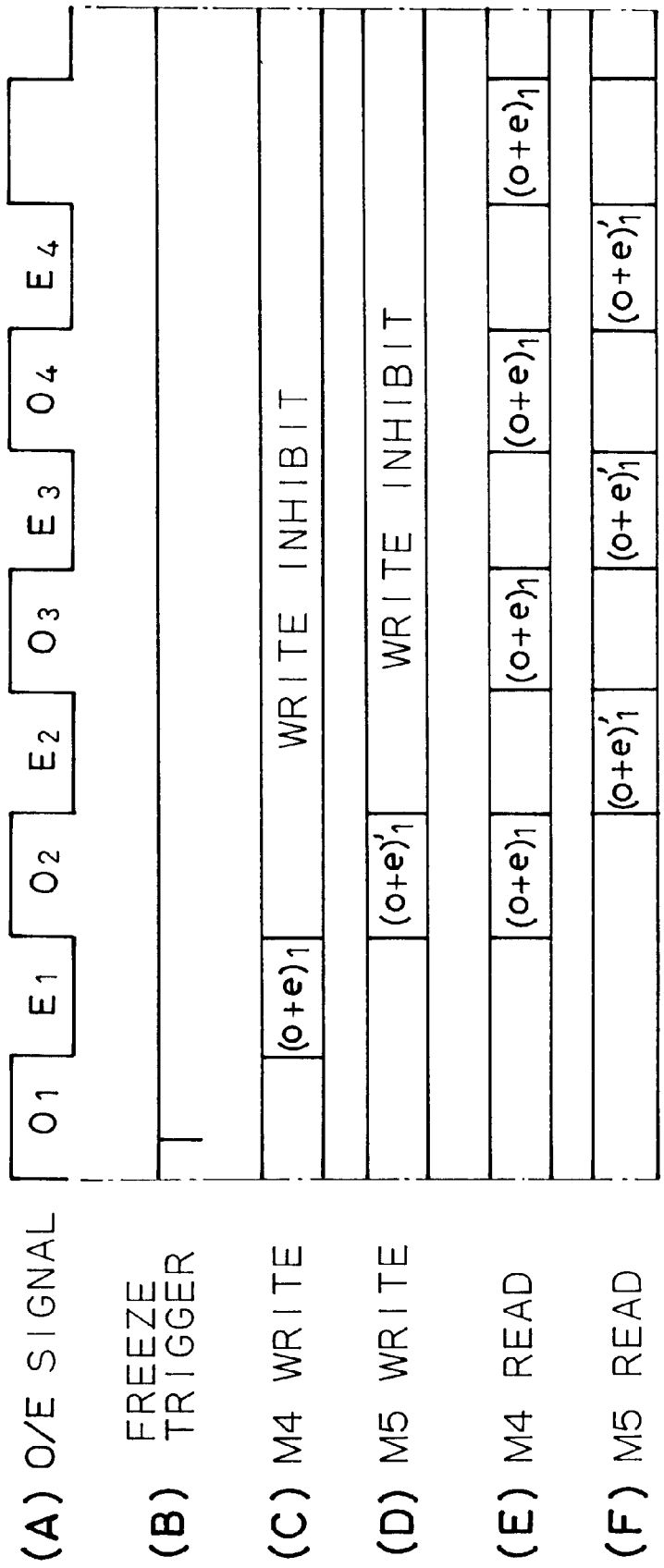
FIGS. 6(A) to 6(F) are waveform diagrams showing operations for forming a static image in accordance with the image-mixing-and-reading-system (A system)

Then, operations for signal processing by each system will be described below. FIGS. 5(A) to 5(H) and FIGS. 6(A) to 6(F) show image processing timings by the pixel mixing and reading system (A system). As described above, when the presence of the all-pixel reading system circuit board 33 is not detected, the pixel mixing and reading system is executed. FIGS. 5(A) to 5(H) show processing timings for forming a dynamic image. As shown in FIG. 5(A), a field O(Odd)/E(Even) signal every 1/60 sec is used for image processing. Moreover, as shown in FIG. 5(B), light-source light is always supplied through the light guide 26 and as shown in FIGS. 5(C) and 5(D), read pulses become the same.

Then, the pixel-mixed signal described for FIG. 2(B) is output from the CCD 11 through the route "a" and as shown in FIG. 5(E), mixed signals of $(o+e)_1$ accumulated in a 01 field period, $(o+e)_2$ accumulated in a 02 period, and $(o+e)_3$ accumulated in 03 period, . . . are written in the fourth memory 18 and mixed signals (those having combination lines different from each other) of $(o+e)_1{}'$ accumulated in an E1 field period, $(o+e)_2{}'$ accumulated in an E2 period, and $(o+e)_3{}'$ accumulated in an E3 period, . . . are written in the fifth memory 19. Thereafter, these video signals are read by one period later and output to a monitor and thereby, a dynamic image is displayed on the monitor as shown in FIGS. 5(G) and 5(H).

FIGS. 6(A) to 6(F) show timings of a static image formed in accordance with a freeze signal. For example, when it is assumed that a freeze trigger is output at the timing shown in FIG. 6(B), mixed signals of $(o+e)_1$ accumulated through exposure in the O1 period (FIG. 6(A)) are written in the fourth memory 18. Moreover, as shown in FIG. 6(D), mixed signals of $(o+e)_1'$ accumulated through exposure in the next E1 period are written in the fifth memory 19 and thereafter, write of data in these memories 18 and 19 is inhibited. Then, these video signals are repeatedly read as shown in FIGS. 6(E) and 6(F) and thereby, a static image is displayed on a monitor.

Figure 7:
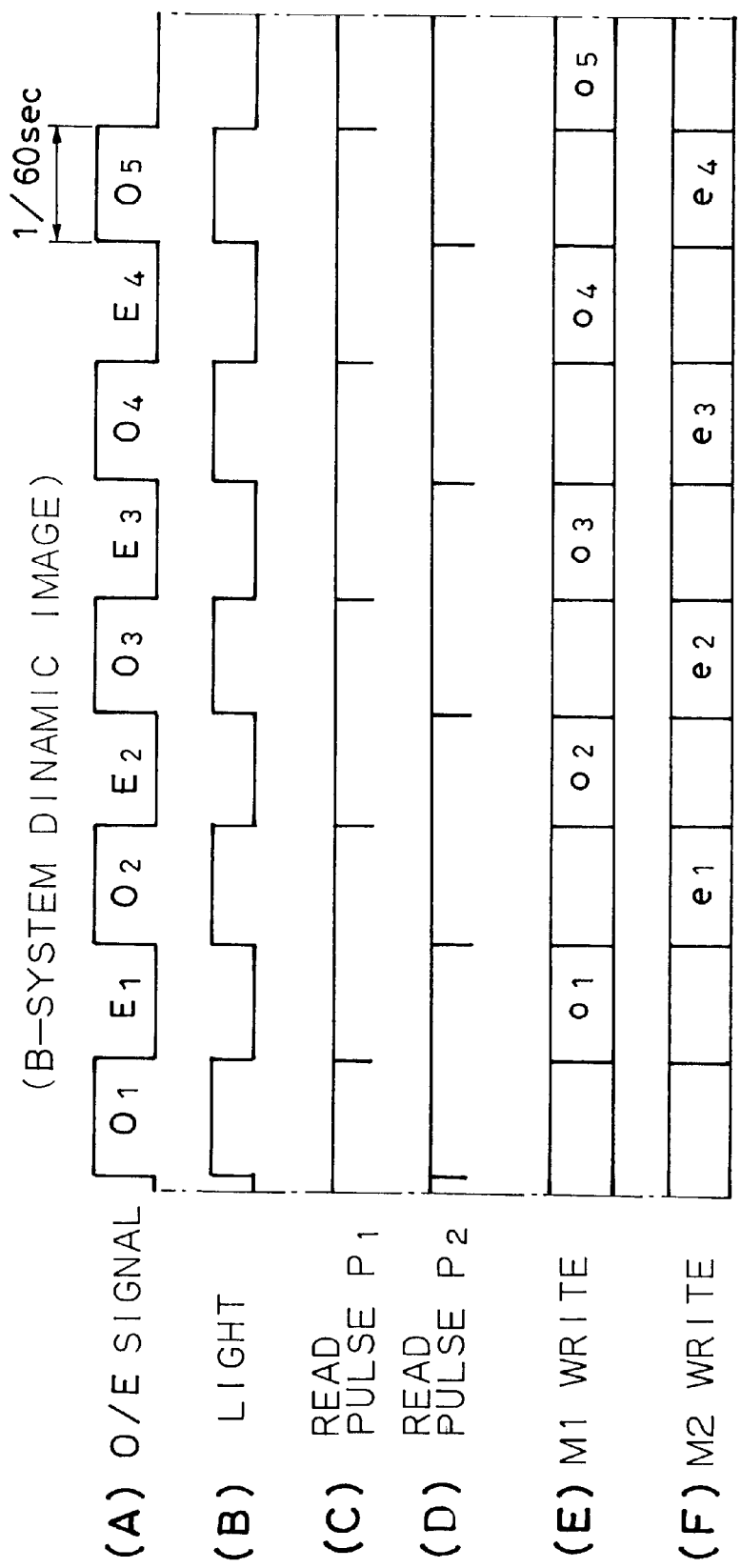
FIGS. 7(A) to 7(F) are waveform diagrams showing operations for forming a dynamic image in accordance with an all-pixel reading system (B system) of the first embodiment.

FIGS. 7 to 9 show image processing timings of the all-pixel reading system (B system). When the presence of the all-pixel reading system circuit board 33 is detected, the all-pixel reading system is executed by the microcomputer 14. FIGS. 7 and 8 show processing timings for forming dynamic images. In this case, the light chopper 30 in FIG. 1 is rotated correspondingly to the field O/E signal in FIG. 7(A) and thereby, light is output every, for example, odd-field period (1/60 sec) as shown in FIG. 7(B). Moreover, the read pulse P1 output every 1/30 sec shown in FIG. 7(C) and the read pulse P2 in FIG. 7(D) one period shifted from the pulse P1 are supplied to the CCD 11.

Then, the odd-line and even-line signals described for FIG. 2(C) are input from the CCD 11 through the route "b," and odd-line signals of $o_1$ accumulated in a O1 field period, $o_2$ accumulated in a O2 period, and o3 accumulated in a O3 period, . . . are written in the first memory 34, and even-line signals of $e_1$ accumulated in an E1 field period, $e_2$ accumulated in an E2 period, and $e_3$ accumulated in an E3 period are written in the second memory 35.

Then, these odd-line and even-line signals are respectively read out two times as shown in FIGS. 8(G) and 8(H). As for a read signal shown by a dot-line circle in FIG. 8(G) is written in the third memory 36 and a video signal in the third memory 36 is also read out two times as shown in FIG. 8(I). Then, the signals in FIGS. 8(H) and 8(I) are pixel-mixed by the mixing circuit 37 as shown in FIG. 2(C), and as shown in FIG. 8(J), signals of $o_1+e_1$, $o_2+e_2$, $e_3+e_3$, . . . are written in the fourth memory 18 and signals of $(o_1+e_1)'$, $(o_2+e_2)'$, $(o_3+e_3)'$, . . . are written in the fifth memory 19. Thereafter, these video signals are read out one period later as shown in FIGS. 8(L) and 8(M) and output to a monitor, and thereby, a dynamic image is displayed on the monitor.

FIGS. 9(A) to 9(K) show timings of a static image formed in accordance with a freeze signal. For example, when a freeze trigger is output at the timing shown in FIG. 9(B) (either of continuous-line position and dotted-line position is permitted), signals of $o_1$ accumulated through the exposure in the O1 period are written in the first memory 34 as shown in FIG. 9(C) and data write is inhibited for, for example, three periods after the signals are written in the memory 34. Moreover, as shown in FIG. 9(D), signals of $e_1$ accumulated through the exposure in the O1 period are written in the second memory 35 and data write is inhibited for, for example, three periods after the signals are written in the memory 35.

Then, these signals are repeatedly read out as shown in FIGS. 9(E), 9(F), and 9(G) and added and mixed each other by the mixing circuit 37. Then, as shown in FIG. 9(H), signals of $o1+e_1$ are written in the fourth memory 18 and signals of $(o_1+e_1)'$ are written in the fifth memory 19. Thereafter, data write is inhibited. Then, these video signals are repeatedly read out one period later as shown in FIGS. 9(J) and 9(K) and thereby, a static image is displayed on a monitor.

The all-pixel reading system of this embodiment makes it possible to form one image in accordance with pixel signals obtained through one-time exposure. Therefore, a high image quality is obtained and particularly, the system is useful for observation of a static image. Moreover, because the latest black-level signal is always input through the route "a," it is possible to preferably keep the color reproducibility even after a static image is displayed.

Second Embodiment

Figure 10:
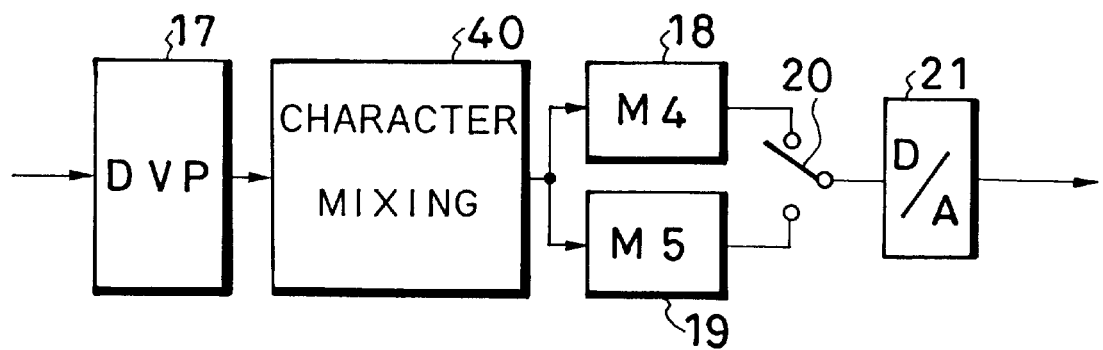
FIG. 10 is a block diagram showing a circuit a configuration of a second embodiment.
Figure 11:
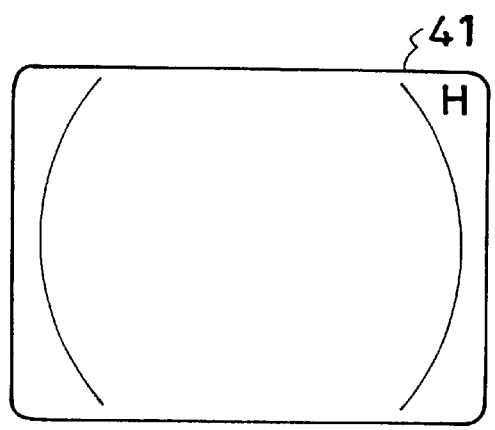
FIG. 11 is an illustration showing a display state on a monitor of the second embodiment.

FIGS. 10 and 11 show a configuration of a second embodiment of displaying a processing system currently operated on a monitor. As shown in FIG. 10, the second embodiment has the same configuration as the first embodiment and has a character mixing circuit 40 including a character generator between a DVP 17 on one hand and fourth and fifth memories 18 and 19 on the other. The character mixing circuit 40 makes it possible to add a character image to a video signal. Thereby, as shown in FIG. 11, a character or the like showing a system is displayed on the top right of the screen of a monitor 41. In case of this embodiment, a pixel mixing and reading system is indicated by N and an all-pixel reading system is indicated by H. It is also possible to use icons instead of these characters.

The above embodiments allow an all-pixel reading system circuit board 33 to be selectively set. However, it is also permitted to set the circuit board 33 as a standard component and removably set a pixel mixing and reading system circuit board.

As described above, the first and second embodiments make it possible to easily use an all-pixel reading system instead of a conventional pixel-mixing-and-reading system and a user can select a high-quality image by considering various states. Moreover, an advantage is obtained that it is possible to easily confirm on a monitor screen whether a present displayed image is obtained from a pixel mixing and reading system or an all-pixel reading system.

Third Embodiment

Figure 12:
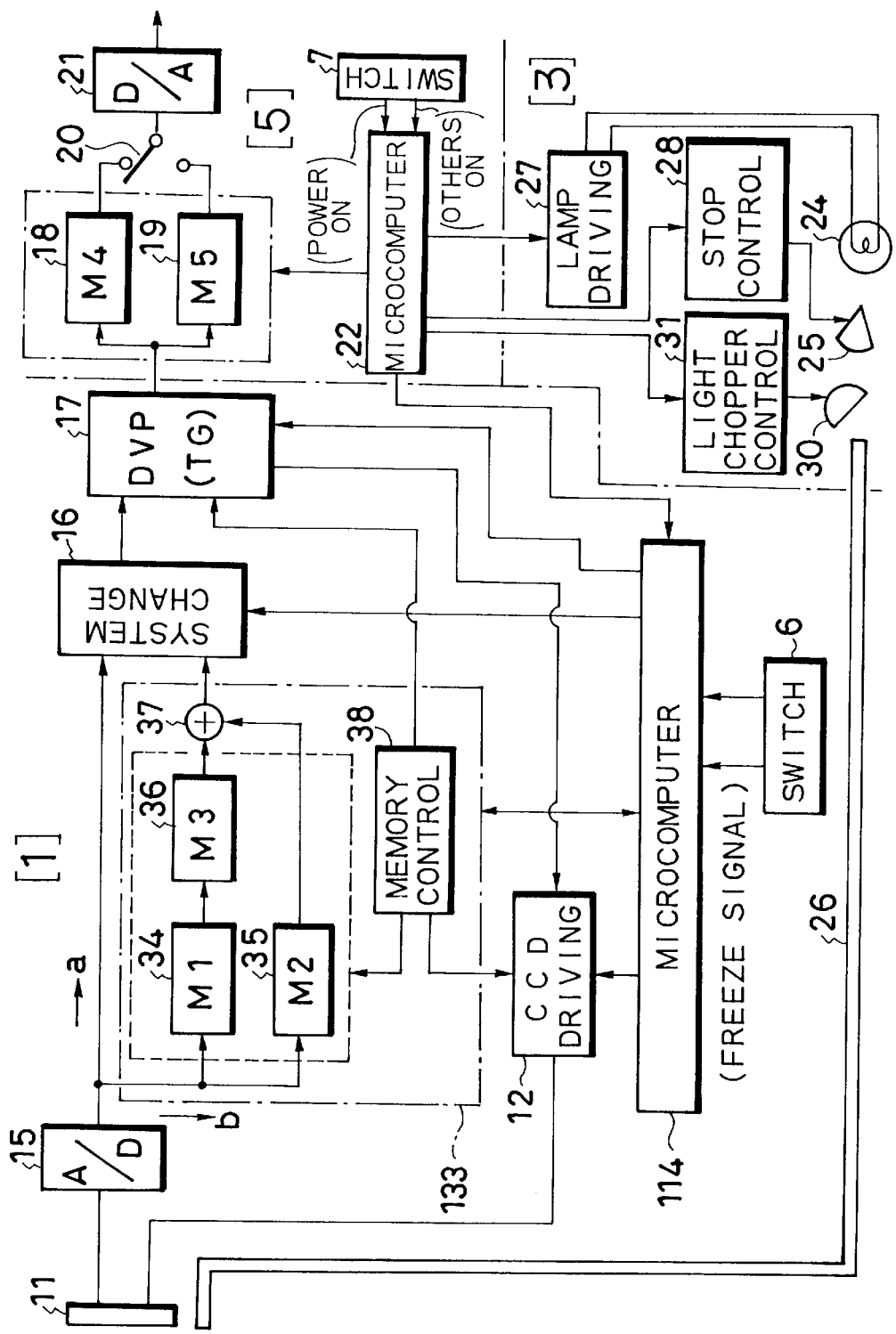
FIG. 12 is a block diagram showing a circuit configuration of an electronic endoscope apparatus of a third embodiment.
Figure 13:
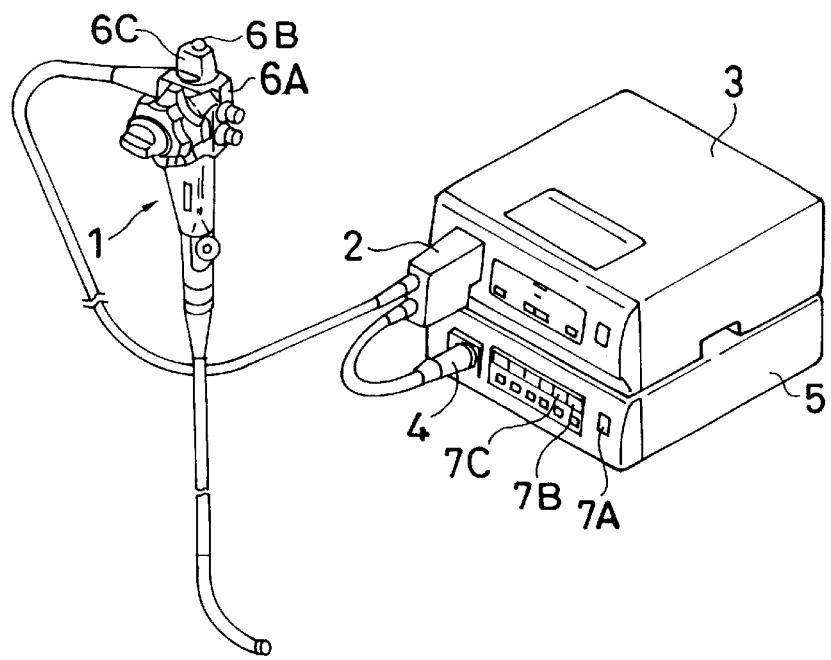
FIG. 13 is a perspective view showing the entire configuration of the electronic endoscope apparatus of the third embodiment.

FIG. 12 shows a circuit configuration of the electronic endoscope apparatus that is a third embodiment and FIG. 13 shows a general view of the system. In FIG. 13, the electronic endoscope apparatus is configured so that an electronic scope (electronic endoscope) 1 is connected to a light-source unit 3 through a connector section 2 and moreover connected to a processor unit 5 through a connector 4. Moreover, a freeze switch 6A, a VTR switch 6B, and a zoom switch 6C are arranged on the electronic scope 1 and a power-supply switch 7A, a contour compensation switch 7B, and a shutter-speed switch 7C are arranged on the processor unit 5.

As shown in FIG. 12, circuits configured in the electronic endoscope apparatus are almost the same as those of the first embodiment. Circuits from the CCD 11 up to the digital signal processor (DVP) 17 are provided for the electronic scope 1 and moreover, an all-pixel reading system circuit board 133 is set to the scope 1. The circuit board 133 is set to a predetermined position by general connection means such as a removable connector so that the board 133 can be optionally set and connected. A first memory 34 for storing video data of odd lines, a second memory 35 for storing video data of even lines, a phase-adjusting third memory 36 for directly storing the data in the first memory 34 and delaying a read timing by 1/60 sec, a mixing circuit 37, and a memory control circuit 38 are mounted on the all-pixel reading system circuit board 133.

Moreover, a microcomputer 114 for generally controlling the electronic scope 1 is used, which selects an operation system in accordance with an operation signal input from a switch 6 such as the freeze switch 6A.

The processor unit 5 is provided with not only a fourth memory 18 and a fifth memory 19 for storing odd-field data and even-field data but also a D/A converter 21 and a microcomputer 22 and operation signals of various switches 7 including the above power-supply switch 7A are supplied to the microcomputer 22.

The above light-source unit 3 is provided with members from a lamp 24 up to a light chopper 30 and the output light of the lamp 24 is guided up to the front end of the scope by a light guide 26. Moreover, the light chopper 30 is constituted of, for example, a semicircular plate and rotated by a light chopper control circuit 31. The light chopper 30 and the light chopper control circuit 31 alternately interrupt light in the period of a field O/E signal having a cycle of 1/60 sec when the all-pixel reading system is executed so that all pixels obtained through one-time exposure can be read out.

Moreover, a set state of the all-pixel reading system circuit board 133 is judged by the microcomputer 114. For example, by assuming an output state of a predetermined terminal when not connected as Low and an output state when connected as High, it is possible to detect the presence of the all-pixel reading system circuit board 133. This judgment can be omitted. Moreover, when confirming the presence of the circuit board 133, the microcomputer 114 changes a signal line from a route "a" to a route "b" by the system changer 16 and moreover changes the processing of a CCD driving circuit 12 or the light chopper control circuit 31 to the all-pixel reading system processing.

Moreover, when power is applied to the microcomputer 114 by the power-supply switch 7A of the processor unit 5, the microcomputer 114 detects whether, among various switches 6 arranged on an operating portion of the electronic scope 1 described above, for example, the freeze switch 6A for forming a static image (other switch is also permitted) is pressed (freeze signal) and when detecting the freeze signal, selects and executes not the all-pixel reading system but the pixel mixing and reading system.

The third embodiment comprises the above configuration and the pixel mixing and processings by the pixel mixing and reading system and all-pixel reading system are the same as described for FIG. 2.

Figure 14:
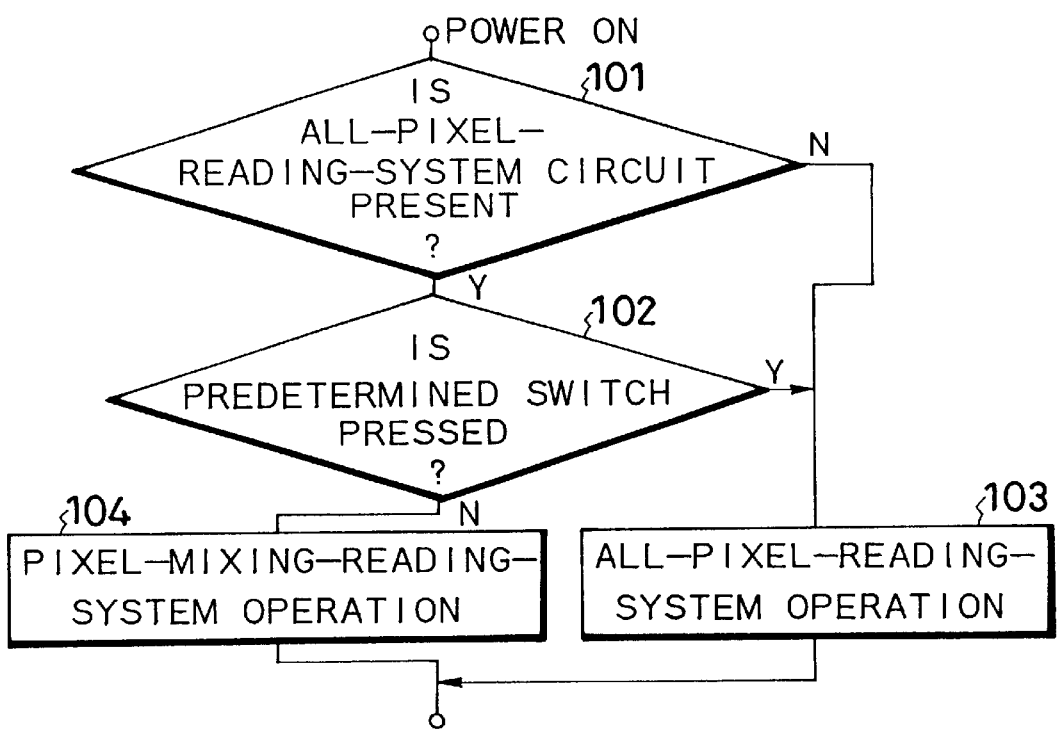
FIG. 14 is an illustration showing operations of a microcomputer of an embodiment.

FIG. 14 shows a system change operation by the microcomputer 114. When the power-supply switch 7A of the processor unit 5 is pressed and a power supply is turned on, it is judged in step 101 whether the all-pixel reading system circuit board 133 is present as illustrated. When a judgment result is "NO," a pixel mixing and reading system operation is executed in step 103. When a judgment result is "YES," step 102 is started. In the step 102, it is judged whether a predetermined switch, that is, the freeze switch 6A in the case of this embodiment is simultaneously pressed. When a judgment result is "NO," an all-pixel reading system operation is executed in step 104. When a judgment result is "YES," step 103 is started to execute a pixel-mixing-reading-system operation.

That is, When the pixel mixing and reading system is assumed as a standard system and an all-pixel reading system circuit 33 is set in accordance with the selection by a user, the all-pixel reading system is automatically selected. However, when the freeze switch 6A is pressed simultaneously with power-on, it is possible to return the system to the pixel mixing and reading system. In case of the third embodiment, though the all-pixel reading system circuit 33 can be set later, it is permitted that the circuit 33 is set as a standard circuit. In this case, it is permitted to omit the judgment in step 101 in FIG. 4.

Moreover, when the freeze switch 6 is pressed at power-on as described above (or when the presence of the all-pixel reading system circuit board 133 is not detected), the pixel mixing and reading system is executed. A dynamic image according to the pixel mixing and reading system is formed through the processing shown in FIG. 5 and a static image according to the system is formed through the processing shown in FIG. 6.

However, when the presence of the all-pixel reading system circuit board 133 is detected at power-on but the freeze switch 6A is not pressed, the all-pixel reading system (B system) is executed by the microcomputer 114. A dynamic image according to the all-pixel reading system is formed through the processings shown in FIGS. 7 and 8 and a static image according to the system is formed through the processing shown in FIG. 9. In case of the all-pixel reading system, one sheet of images can be formed in accordance with a video signal obtained through simultaneously exposure. Therefore, a high image quality is obtained and the system is particularly useful for observation of a static image.

The third embodiment uses an operation switch of an electronic scope 1 as a switch for selecting the pixel mixing and reading system at power-on. Instead of using the operation switch, however, it is also permitted to use a switch such as the contour compensation switch 7B or shutter-speed switch 7C provided for the processor unit 5. In this case, the pixel mixing and reading system can be executed by transmitting that an operation signal of the switch 7B or 7C is input from the microcomputer 22 of the processor unit 5 at power-on to the microcomputer 14 of the electronic scope 1.

Moreover, also in case of the third embodiment, a currently-operated processing system is displayed on a monitor as shown in FIG. 11 in accordance with the circuit configuration in FIG. 10.

In case of the above embodiments, the all-pixel reading system circuit board 133 is selectively set. However, it is also permitted to set the circuit 33 as a standard circuit from the beginning or reverse the relation between the pixel mixing and reading system and the all-pixel reading system. Moreover, when a pixel mixing and reading system circuit section and an all-pixel reading system circuit section are present, it is permitted to operate the all-pixel reading system by preferentially operating the pixel mixing and reading system and pressing the freeze switch 6A or the like simultaneously with power-on.

As described above, according to the third embodiment, it is possible to easily change an all pixel-reading-system operation to a pixel-mixing-and-readying-system operation even when an operation is set so as to be performed in accordance with the all-pixel reading system operation and prompt using an all-pixel reading system capable of obtaining a high-quality static image and a conventional pixel-mixing-and-reading system. Moreover, by using an existing operation switch of a electronic endoscope as the above predetermined switch, advantages can be obtained that systems can be changed by an electronic-scope independently of a processor unit and a circuit configuration for changing systems is simplified.

What is claimed is:

1. An electronic endoscope apparatus comprising:
   a pixel mixing and reading system circuit section for mixing pixel signals between upper and lower horizontal lines and reading said pixel signals from an image pickup device;
   an all-pixel reading system circuit section for reading all pixel signals formed by the image pickup device through the same exposure while using a predetermined opaque period; and
   a control circuit for controlling the circuit sections; wherein
      one of the pixel mixing and reading system and the all-pixel reading system is set as a standard system and the other is configured so as to be selectively settable, and
      the control circuit judges whether the circuit section which can be selectively set is present and when the presence of the circuit section is detected, performs control so as to execute the circuit-section-type operation is performed.

2. The electronic endoscope apparatus according to claim 1, wherein
   the control circuit detects that output states of a predetermined terminal of a connector for connecting the circuit sections are changed to judge whether the terminal is present.

3. The electronic endoscope apparatus according to claim 1, wherein
   a memory for temporarily storing odd-line data and even-line data generated by an image pickup device and adjusting phases of these data values is used as the all-pixel reading system circuit section and a through-line for not passing the memory is used, and
   an optical black pulse for clamping a black level of a video signal is supplied to a signal processing section at the rear stage through the through-line.

4. The electronic endoscope apparatus according to claim 1, wherein
   an indication showing whether the pixel mixing and reading system or the all-pixel reading system is currently operated is set onto a monitor screen.

5. An electronic endoscope apparatus comprising:
   an electronic endoscope provided with an image pickup device;
   a processor unit to which the electronic endoscope is connected;
   switches for various operations;
   a pixel mixing and reading system circuit for mixing pixel signals between upper and lower lines and reading them from an image pickup device;
   an all-pixel reading system circuit for reading all pixel signals generated by the image pickup device through the same exposure while using a predetermined opaque period; and
   a control circuit for performing the control for selectively operating either of the pixel mixing and reading system and the all-pixel reading system, judging whether a predetermined switch other than a power-supply switch among the switches is pressed at power-on, and executing the other of the two systems when detecting that the predetermined switch is pressed.

6. The electronic endoscope apparatus according to claim 5, wherein
   the predetermined switch uses an operation switch of an electronic endoscope.

7. The electronic endoscope apparatus according to claim 5, wherein
   an indication showing whether the pixel mixing and reading system or the all-pixel reading system is currently operated is set onto a monitor screen.

* * * * *